US010266078B2

(12) United States Patent
Mason et al.

(10) Patent No.: US 10,266,078 B2
(45) Date of Patent: Apr. 23, 2019

(54) CHILD SAFETY SEAT

(71) Applicant: Wonderland Nurserygoods Company Limited, Tuen Mun, N.T. (HK)

(72) Inventors: Kyle S. Mason, West Lawn, PA (US); James M. F. Hutchinson, Mohnton, PA (US); Robert E. Haut, Merion Station, PA (US); Curtis M. F. Hartenstine, Birdsboro, PA (US)

(73) Assignee: WONDERLAND NURSERYGOODS COMPANY LIMITED, Tuen Mun, N.T. (HK)

( * ) Notice: Subject to any disclaimer, the term of this patent is extended or adjusted under 35 U.S.C. 154(b) by 0 days.

(21) Appl. No.: 15/701,817

(22) Filed: Sep. 12, 2017

(65) Prior Publication Data

US 2018/0001799 A1    Jan. 4, 2018

Related U.S. Application Data

(62) Division of application No. 14/521,584, filed on Oct. 23, 2014, now Pat. No. 9,789,791.

(60) Provisional application No. 61/996,951, filed on May 19, 2014, provisional application No. 61/995,490, filed on Apr. 10, 2014, provisional application No. 61/961,774, filed on Oct. 23, 2013.

(51) Int. Cl.
| *B60N 2/28* | (2006.01) |
| *A47C 1/023* | (2006.01) |
| *B60N 2/62* | (2006.01) |
| *B60N 2/02* | (2006.01) |

(52) U.S. Cl.
CPC ......... *B60N 2/2863* (2013.01); *B60N 2/2821* (2013.01); *B60N 2/2851* (2013.01); *B60N 2/2875* (2013.01); *A47C 1/023* (2013.01); *B60N 2/0284* (2013.01); *B60N 2/286* (2013.01); *B60N 2/62* (2013.01); *B60N 2205/40* (2013.01)

(58) Field of Classification Search
CPC .. B60N 2/2863; B60N 2/2821; B60N 2/2851; B60N 2/2875
USPC ........................................ 297/250.1–256.17
See application file for complete search history.

(56) References Cited

U.S. PATENT DOCUMENTS

| 5,505,519 A * | 4/1996 | Natt ...................... B60N 2/28 297/250.1 |
| 6,264,278 B1 * | 7/2001 | Weimer ................. B60N 2/28 297/256.11 |
| 6,315,359 B1 * | 11/2001 | Wetter ................ B60N 2/2821 297/250.1 |
| 9,452,695 B2 * | 9/2016 | Sedlack ............. B60N 2/2821 |
| 2014/0368006 A1 * | 12/2014 | Taylor .................. A47D 1/004 297/188.11 |

* cited by examiner

*Primary Examiner* — Syed A Islam
(74) *Attorney, Agent, or Firm* — Baker & McKenzie LLP

(57) ABSTRACT

A child safety seat includes a seat shell and an extension member. The seat shell has a seat portion and a backrest, the seat portion having a front end opposite to the backrest. The extension member is pivotally connected with the seat shell, and is rotatable relative to the seat shell between a retracted position where the extension member is stowed in the seat shell and a deployed position where the extension member deploys forward beyond the front end of the seat shell to expand a leg room at a front of the child safety seat.

9 Claims, 20 Drawing Sheets

CHILD SAFETY SEAT

CROSS-REFERENCE TO RELATED APPLICATION(S)

This application is a Divisional of U.S. patent application Ser. No. 14/521,584, which respectively claims priority to U.S. Provisional Patent Application No. 61/961,774 filed on Oct. 23, 2013; and to U.S. Provisional Patent Application No. 61/995,490 filed on Apr. 10, 2014; and to U.S. Provisional Patent Application No. 61/996,951 filed on May 19, 2014, which are incorporated herein by reference.

BACKGROUND

1. Field of the Invention

The present invention relates to child safety seats.

2. Description of the Related Art

A child safety seat is typically used in an automobile vehicle to properly restrain a child in the event of accidental collision. It is widely known that a child safety seat that is placed in a rear facing position can provide better protection, because it can distribute crash forces over a larger portion of the body (i.e., the back supporting the head). Accordingly, safety experts and car seat manufacturers have changed the recommendations to seat children in a vehicle in a rear facing position until the age of 2 years old. However, the child safety seats currently available on the market are usually dimensioned to receive younger children having a small body. These child safety seats when installed in the rear facing position do not leave enough room to receive older children having longer legs. As a result, parents may feel that the older child's legs would be crushed against the seatback of the vehicle during collision, which discourage the installation of the child safety seat in the rear facing position.

Therefore, there is a need for an improved child safety seat that can accommodate children of different ages, and can address at least the foregoing issues.

SUMMARY

The present application describes a child safety seat that can be adjustable to accommodate children of different ages in a rear facing configuration. In one embodiment, the child safety seat includes a seat shell and an extension member. The seat shell has a seat portion and a backrest, the seat portion having a front end opposite to the backrest. The extension member is pivotally connected with the seat shell, and is rotatable relative to the seat shell between a retracted position where the extension member is stowed in the seat shell and a deployed position where the extension member deploys forward beyond the front end of the seat shell to expand a leg room at a front of the child safety seat.

DETAILED DESCRIPTION OF THE EMBODIMENTS

Figure 1:
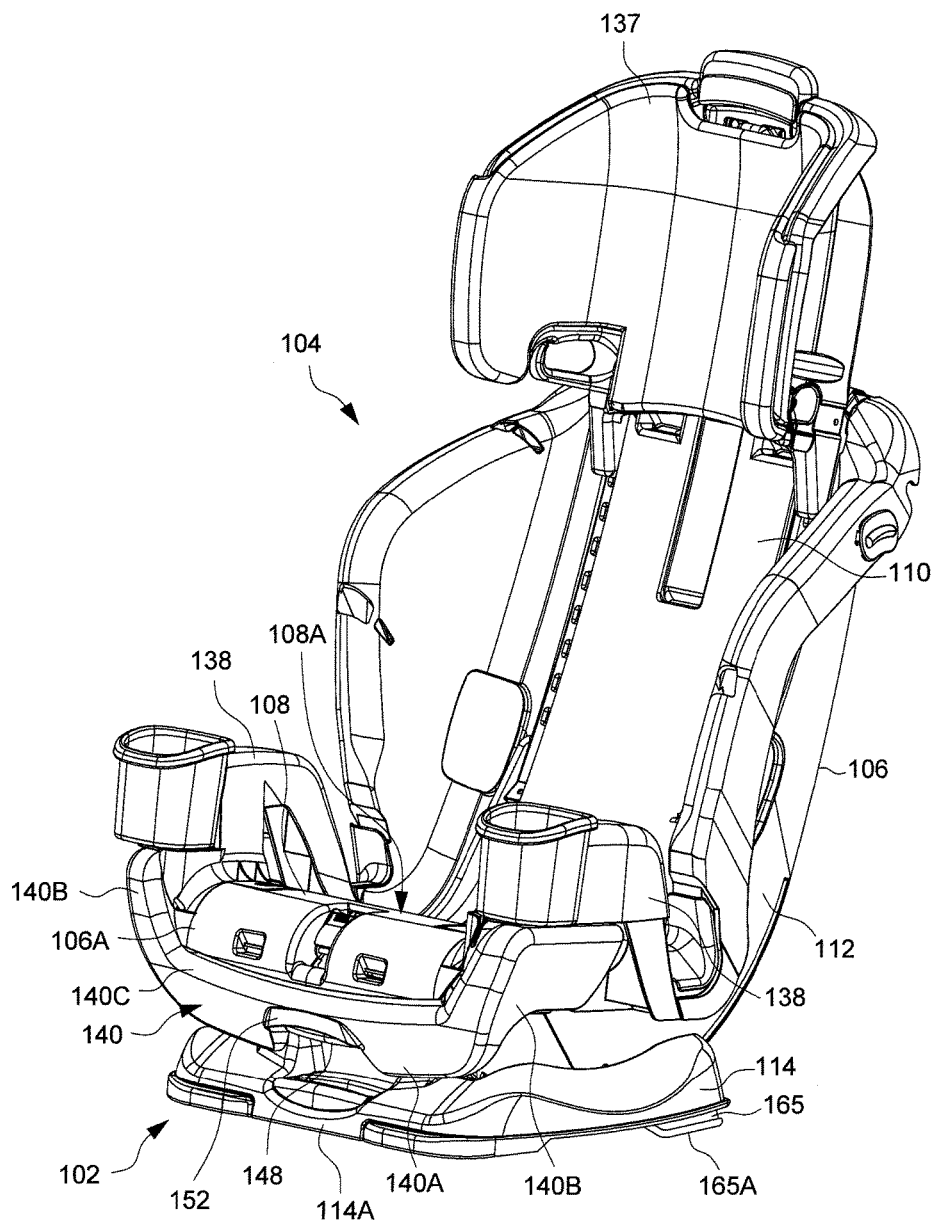
FIG. 1 is a schematic view illustrating an embodiment of a child safety seat.

FIG. 1 is a schematic view illustrating an embodiment of a child safety seat 100 suitable for seating a child in a vehicle. The child safety seat 100 can include a base 102, and a child carrier 104 that can be detachably installed on the base 102. The base 102 can provide stable support for the child carrier 104, and also allow recline adjustment of the child carrier 104. The child carrier 104 includes a seat shell 106 having a seat portion 108 and a backrest 110. The seat shell 106, including the seat portion 108 and the backrest 110, can be formed integrally by plastic molding. The seat shell 106 can include two support rails 112 protruding at an underside of the seat shell 106 and having a curved, angled or inclined shape, which can rest in contact against an upper surface of the base 102. Once it is arranged on the base 102, a fastener system can be operable to lock the child carrier 104 in place. The assembly of the child carrier 104 and the base 102 can then be installed in a suitable configuration on a vehicle seat, in particular in a position facing rearward (i.e., facing a seatback of a vehicle seat).

Figure 2:
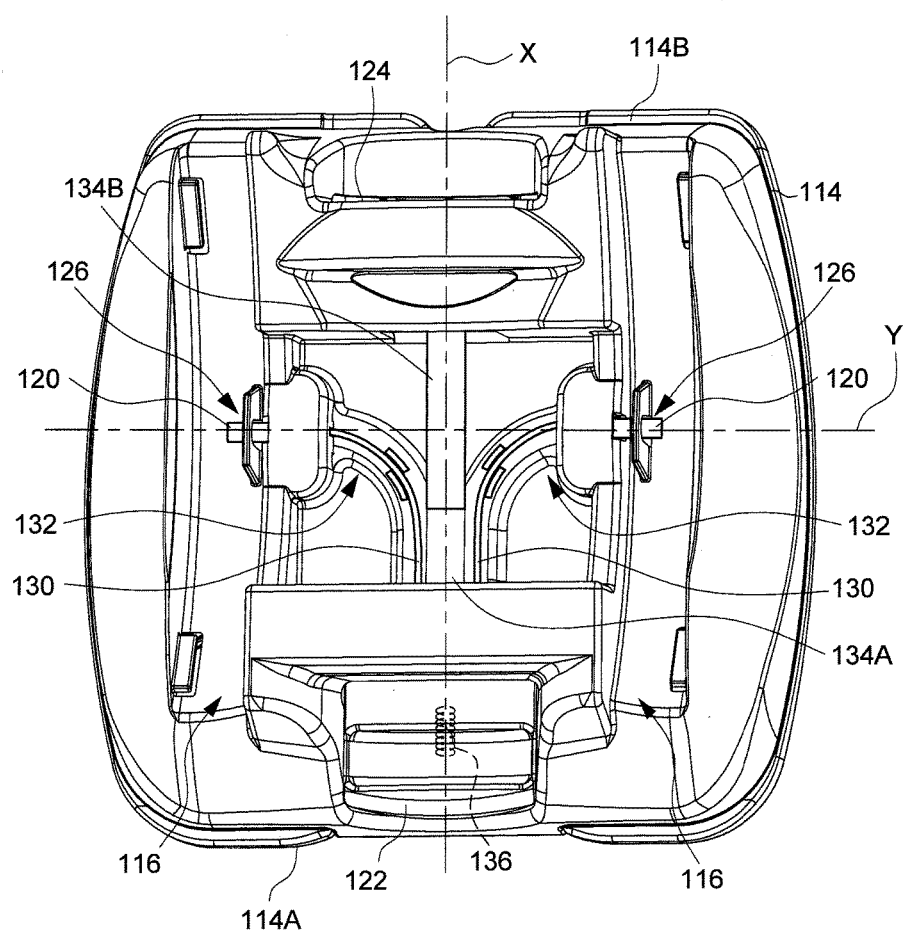
FIG. 2 is a schematic view illustrating the construction of a base used in the child safety seat shown in FIG. 1.

In conjunction with FIG. 1, FIG. 2 is a schematic view illustrating a construction of the base 102. The base 102 can include a shell body 114 having two opposite ends 114A and 114B, and a lengthwise axis X extending from the first end 114A to the second end 114B. The two ends 114A and 114B can correspond, e.g., to a rear and a front (or reversely) of the child safety seat 100. An upper surface of the base 102 can have two recessed regions 116 transversally apart from each other, and the two support rails 112 of the seat shell 106 can respectively rest in the two recessed regions 116 when the child carrier 104 is installed on the base 102.

For locking the child carrier 104 in place, the base 102 can include a latching mechanism comprised of two locking parts 120, and two actuating interfaces 122 and 124 that are exposed and are respectively arranged near the two ends 114A and 114B of the base 102. The two locking parts 120 can be guided for sliding displacement in opposite directions along a transversal axis Y through two guide channels 126 provided on the shell body 114. The locking parts 120 can respectively engage any of multiple apertures 128 (better shown in FIG. 3) provided on two inner sidewalls of the two support rails 112 to lock the position of the child carrier 104 on the base 102, and disengage from the apertures 128 to allow recline adjustment of the child carrier 104 on the base 102. The locking parts 120 can selectively engage any of the apertures 128 to lock the child carrier 104 in different angular positions on the base 102.

The two actuating interfaces 122 and 124 can be formed as buttons, handles, or any other suitable shapes easy to operate for a caregiver. The two locking parts 120 can be respectively connected with the actuating interface 122 via two elastically deformable arms 130. Each of the arms 130 can have a first end affixed with the actuating interface 122, and a second end affixed with the locking part 120 associated therewith. The two arms 130 can be restrainedly positioned in a guide structure provided in the shell body 114. The guide structure can have two passages 132 that extend parallel near the actuating interface 122, and then diverge from each other to respectively connect with the guide channels 126. With this construction, sliding displacement of the actuating interface 122 along the lengthwise axis X can drive the arms 130 in movement along the two passages 132, which causes local deformation of the arms 130 owing to the sliding contact between the arms 130 and the passages 132. The displacement of the arms 130 in turn can drive the locking parts 120 to slide transversally in opposite directions to engage or disengage the support rails 112 of the child carrier 104.

Referring again to FIG. 2, the two actuating interfaces 122 and 124 can be assembled with the shell body 114 for sliding displacement along the lengthwise axis X, and can be connected with each other via one linkage arrangement. In one embodiment, the actuating interface 122 can have one elongated extension 134A, and the actuating interface 124 can have another extension 134B that can detachably connect to the extension 134A of the actuating interface 122. The connection of the two extensions 134A and 134B (e.g., by contact) can form a linkage allowing the two actuating interfaces 122 and 124 to move in unison to drive unlocking displacement of the locking parts 120. For example, the actuating interface 124 at the end 114B of the base 102 can be pushed by the caregiver to push the actuating interface 122 in movement via the contact between the extensions 134A and 134B and cause unlatching displacement of the locking parts 120. Alternatively, the actuating interface 122 at the end 114A of the base 102 can be pulled by a caregiver to cause unlatching displacement of the locking parts 120, the extension 134A moving away from the extension 134B of the actuating interface 124 during the unlatching displacement of the actuating interface 122. In other embodiments, the two extensions 134A and 134B may be affixed with each other or formed as an integral linkage connected with the two actuating interfaces 122 and 124, so that the two actuating interfaces 122 and 124 always move in unison. The arrangement of the two actuating interfaces 122 and 124 at two opposite ends 114A and 114B of the base 102 can offer better access for a caregiver to disengage the locking parts 120 for recline adjustment of the child carrier 104 from the base 102, regardless of the orientation of the base 102 during installation (i.e., facing forward or rearward).

In one embodiment, the actuating interface 122 can be further connected with a spring 136 (shown with phantom lines). The spring 136 can bias the actuating interface 122 in a direction for causing latching displacement of the arms 130 and the locking parts 120 connected therewith.

Figure 3:
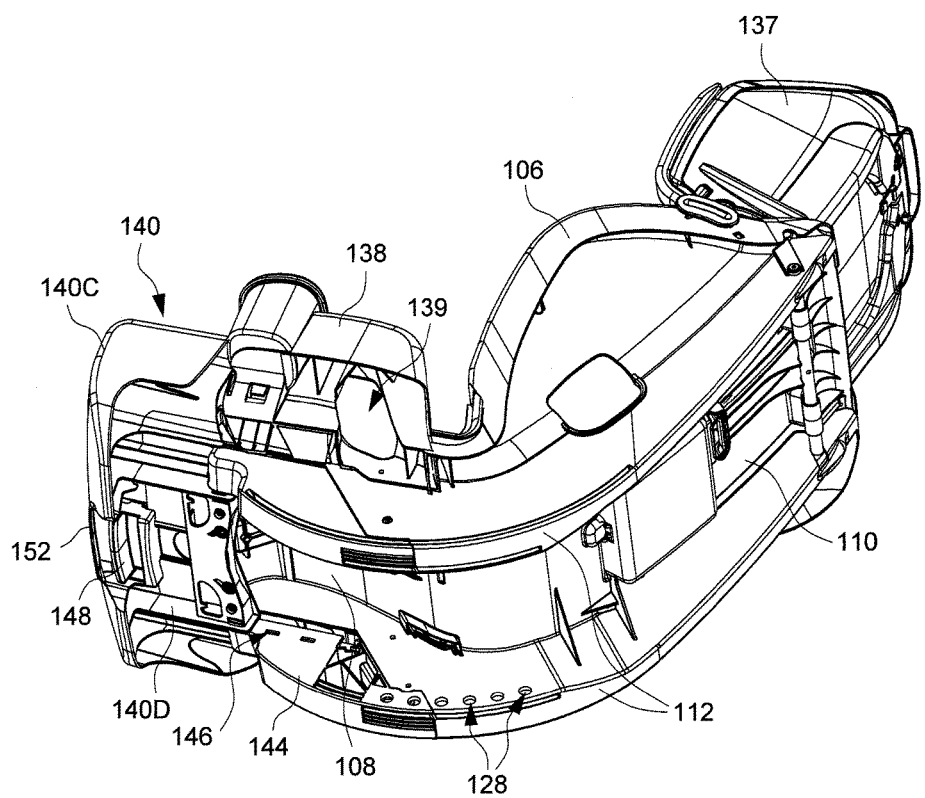
FIG. 3 is a schematic view illustrating a child carrier used in the child safety seat shown in FIG. 1.

In conjunction with FIG. 1, FIG. 3 is a schematic view illustrating the child carrier 104 alone. Referring to FIGS. 1 and 3, the seat portion 108 of the seat shell 106 can have an upper surface 108A on which a child can sit, and can extend from the backrest 110 toward a front of the seat shell 106 and terminate at a front end 106A of the seat shell 106 opposite to the backrest 110. The backrest 110 can be assembled with a headrest 137 that is adjustable to adapt to the height of the child. Moreover, the seat shell 106 can have a left and a right armrest 138 disposed adjacent to a left and a right border of the seat shell 106, which rise upward from the upper surface 108A. Lateral openings 139 may be provided through the left and right sides of the seat shell 106 for passage of a vehicle seatbelt when the child safety seat 100 is installed on a vehicle seat.

An extension member 140 can be assembled with the seat shell 106 for sliding displacement along a lengthwise axis extending from a rear to a front of the seat shell 106. The extension member 140 can have a transversal portion 140A extending across a width of the seat portion 108, and two bent portions 140B respectively connected with a left and a right side of the transversal portion 140A. The bent portions 140B can rise upward from the transversal portion 140A. In one embodiment, the extension member 140, including the transversal portion 140A and the two bent portions 140B, may be formed as an integral body. The extension member 140 thereby formed may have a generally U-shape with an enlarged transversal portion 140A. The extension member 140 may be arranged through a cavity of the seat shell 106 that generally extends from the front end 106A of the seat shell 106 toward the rear of the seat shell 106, the transversal portion 140A lying below the upper surface 108A, and the two bent portions 140B being respectively adjacent to an underside of the armrests 138. In one embodiment, the two bent portions 140B may rise higher than the upper surface 108A of the seat portion 108. The extension member 140 can slide forward relative to the seat shell 106 to a first position where a forward end 140C of the extension member 140 is deployed forward away from the front end 106A of the seat shell 106 (as better shown in FIG. 6), and retract into the seat shell 106 to a second position where the forward end 140C lies adjacent to the front end 106A of the seat shell 106 (as better shown in FIG. 7). In addition, the extension member 140 can also occupy multiple intermediate positions between the aforementioned first and second positions.

Figure 4:
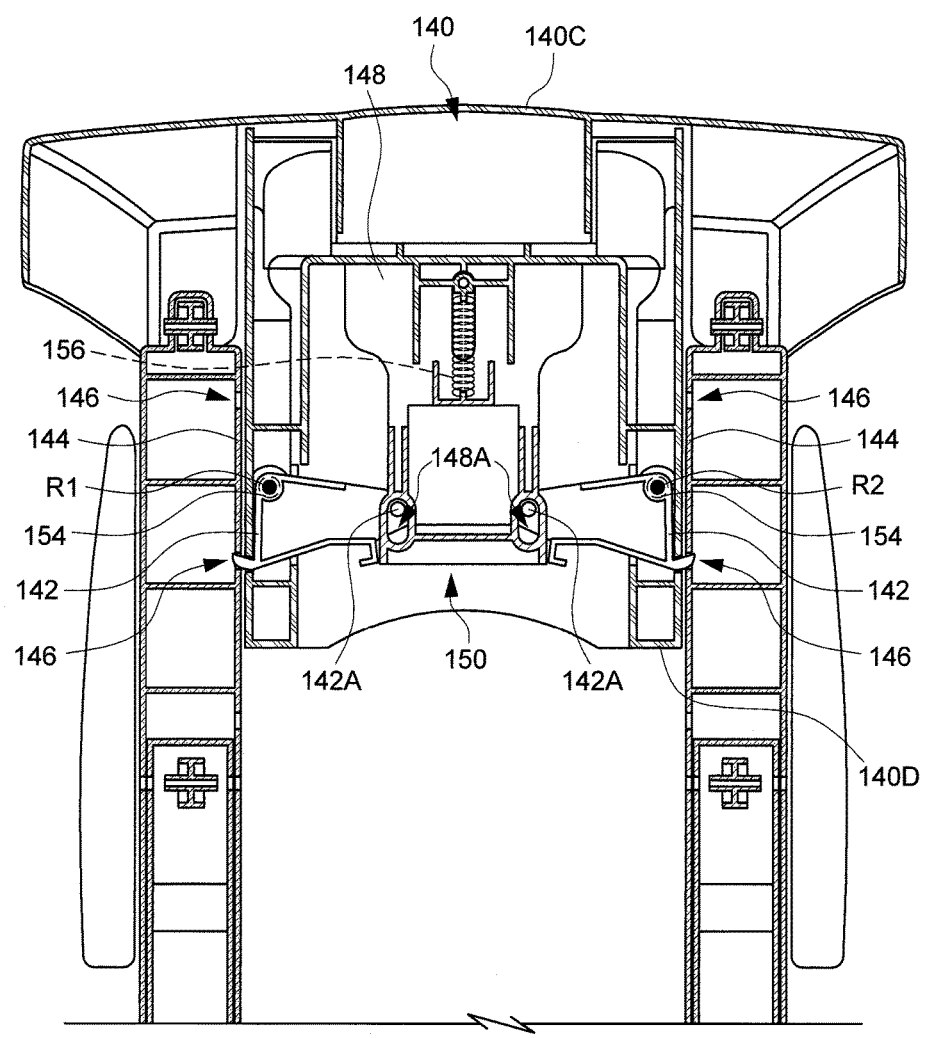
FIG. 4 is a partial cross-sectional view illustrating a latching mechanism for locking an extension member in the child carrier shown in FIG. 3.
Figure 5:
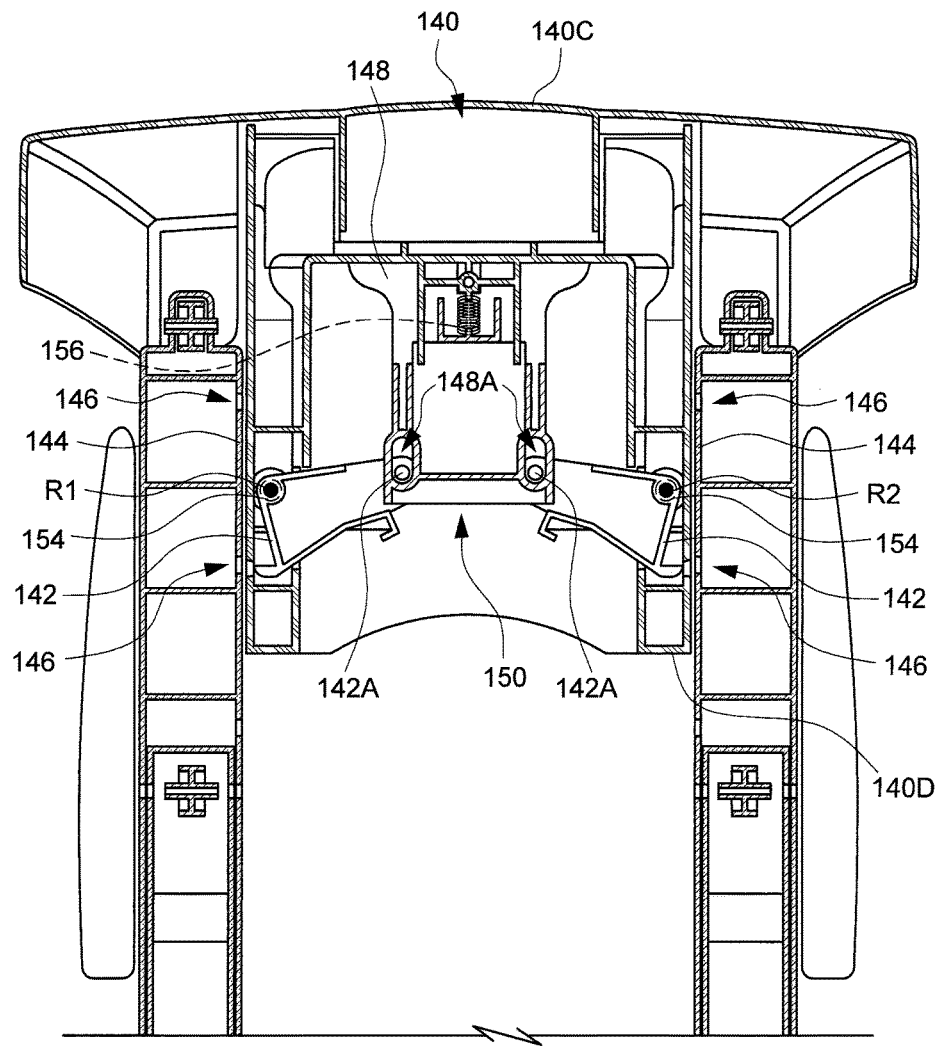
FIG. 5 is a partial cross sectional view illustrating the latching mechanism of FIG. 4 in an unlocking position.

In conjunction with FIG. 3, FIGS. 4 and 5 are schematic partial cross-sectional views illustrating a latching mechanism for locking the extension member 140 in any of the multiple positions described previously. This latching mechanism can include two latches 142 that are connected with the extension member 140 at two locations transversally spaced apart from each other. The extension member 140 can have a mount portion 140D that is connected with the transversal portion 140A and is arranged between two fixed sidewalls 144 of the seat shell 106. The two latches 142 may be pivotally connected with the extension member 140 about pivot axes R1 and R2, and may be disposed adjacent to a left and right side edge of the mount portion 140D. Each of the latches 142 can be affixed with a pin 142A disposed eccentric from the pivot axis R1 or R2. The latches 142 can rotate relative to the extension member 140 to respectively engage with the two sidewalls 144 of the seat shell 106 to lock the extension member 140 in place. More specifically, each of the sidewalls 144 can have a plurality of apertures 146, and the associated latch 142 can respectively engage with a first one of the apertures 146 to lock the extension member 140 in the first position, and with a second one of the apertures 146 to lock the extension member in the second position.

The extension member 140 can be further assembled with a release part 148 that can extend lengthwise into a gap 150 between the two latches 142. The release part 148 is assembled for sliding displacement along a lengthwise axis extending from a front to a rear of the seat shell 106, and is arranged at a central location of the extension member 140. Two elongated slots 148A may be formed through the release part 148 at two transversally spaced apart locations. When the release part 148 is assembled with the extension member 140, the two pins 142A of the two latches 142 can be respectively received in the two slots 148A, the length of the slots 148A being greater than the pins 142A so that limited relative displacement between the release part 148 and the latches 142 is allowed. The release part 148 can be located near the forward end 140C, and can be concealed behind a cap 152 formed with the forward end 140C. The release part 148 can be movable between a locking position as shown in FIG. 4 and an unlocking position as shown in FIG. 5. In the locking position shown in FIG. 4, the release part 148 is located in the gap 150 and the latches 142 can engage with the sidewalls 144 of the seat shell 106 for locking the extension member 140 in place. Torsion springs 154 can be used to bias the latches 142 to engage with the sidewalls 144.

For unlocking the latches 142, the release part 148 is pulled forward so that it moves relative to the extension member 140 away from the gap 150 for allowing unlocking rotation of the latches 142. As the release part 148 continues to move further forward, end edges of the slots 148A can respectively contact and engage with the pins 142A, whereby the latches 142 can be driven in rotation by the release part 148 to disengage from the sidewalls 144. In one embodiment, the release part 148 may be biased by a spring 156 (shown with phantom lines) toward the locking position, and a caregiver can pull the release part 148 forward against the biasing force of the spring 156 to switch the release part 148 from the locking position to the unlocking position for allowing displacement of the extension member 140.

Figure 6:
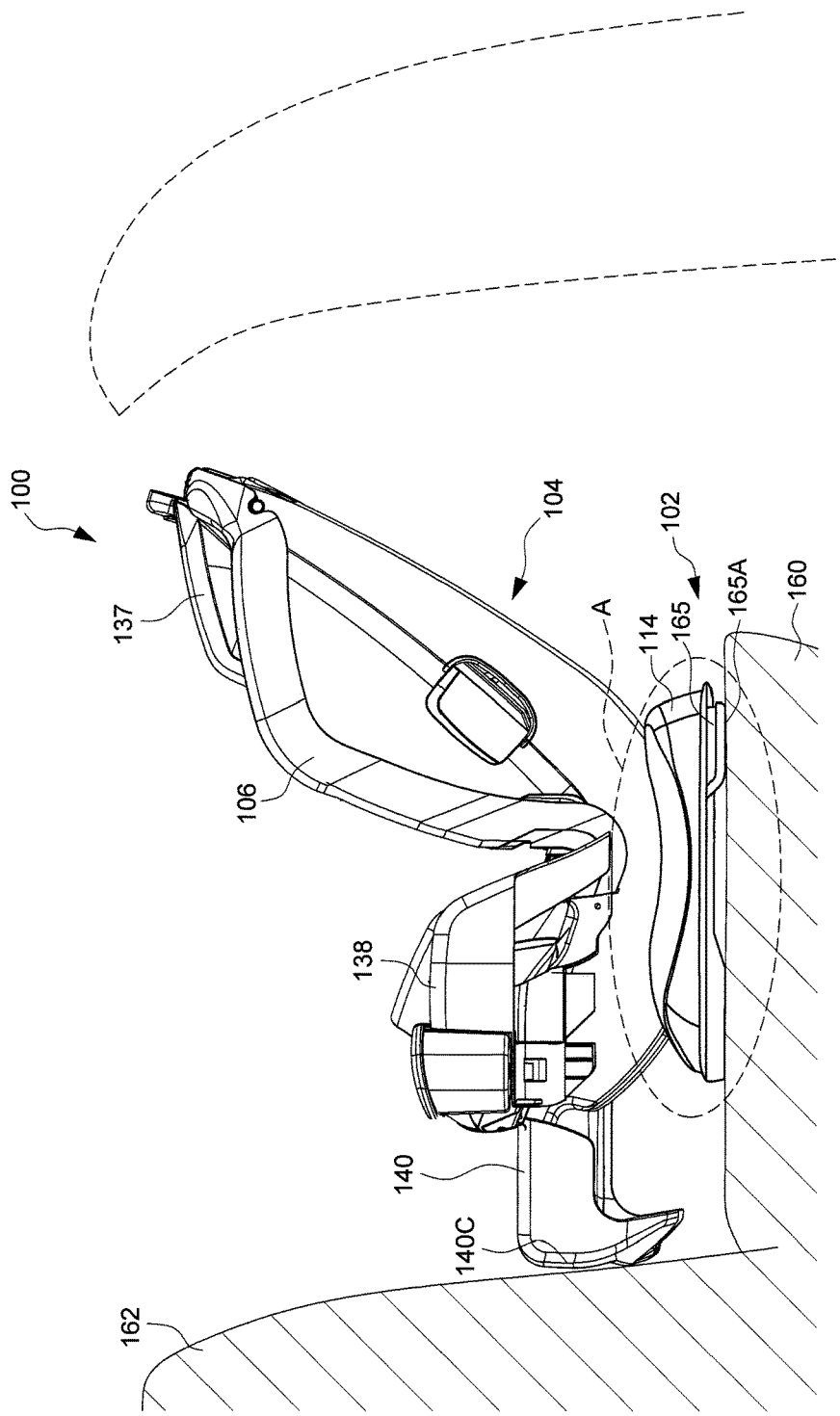
FIG. 6 is a schematic view illustrating the child safety seat installed facing rearward in a first angular position on a vehicle seat.
Figure 7:
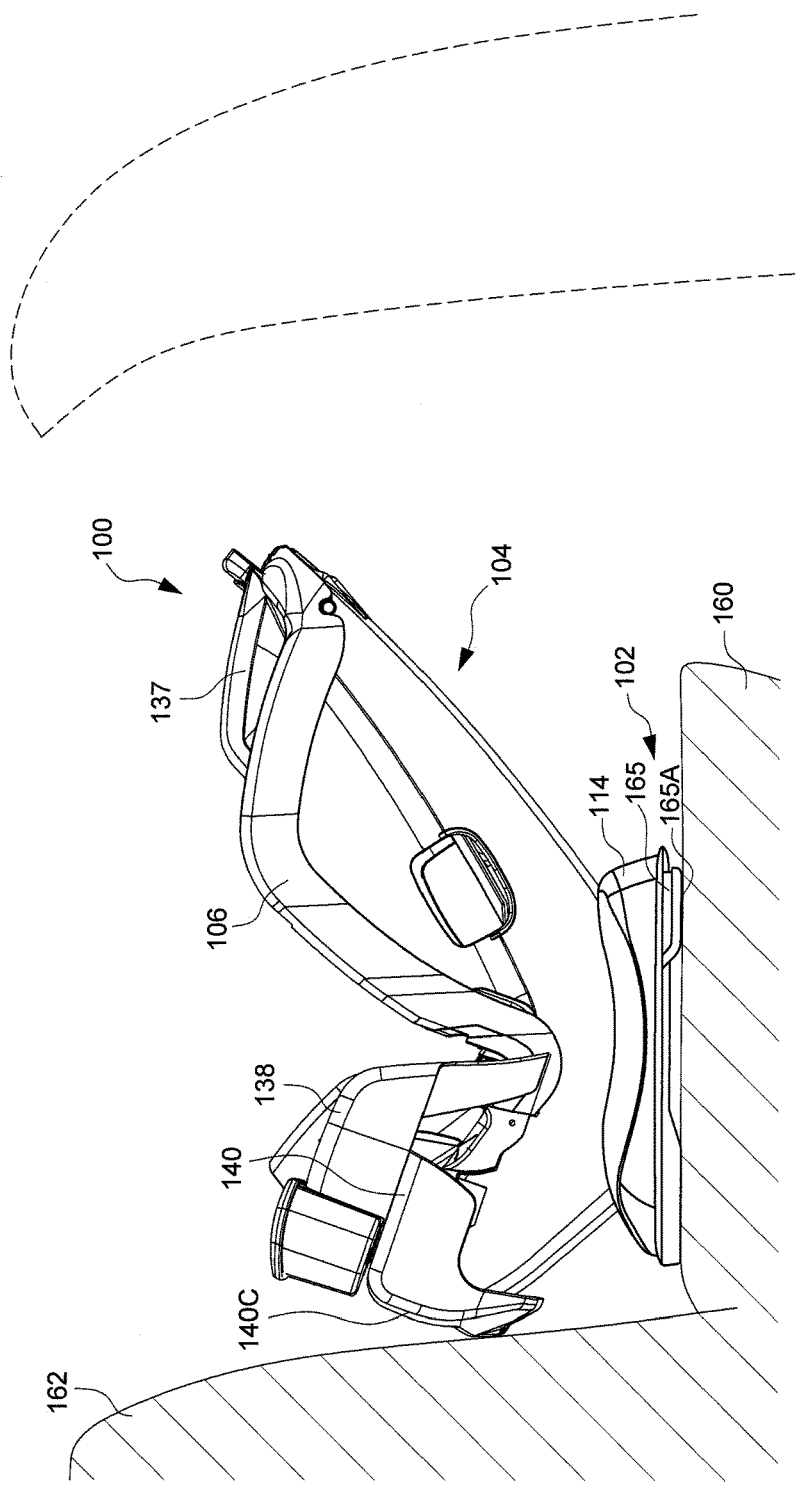
FIG. 7 is a schematic view illustrating the child safety seat installed facing rearward in a second angular position on a vehicle seat.

FIGS. 6 and 7 are schematic views illustrating the child safety seat 100 installed on a vehicle seat 160 in a rear facing configuration. In the rear facing configuration, the child safety seat 100 is arranged such that its front faces a seatback 162 of the vehicle seat 160. When the child safety seat 100 is in the rear facing configuration, the seat shell 106 of the child carrier 104 is adjustable relative to the base 102 to multiple angular positions, such as an upright or first angular position as shown in FIG. 6, and a recline or second angular position as shown in FIG. 7 that is inclined rearward relative to the first angular position of FIG. 6. The locking parts 120 on the base 102 can engage with different sets of the apertures 128 (better shown in FIGS. 2 and 3) to lock the seat shell 106 in any of the angular positions.

While the seat shell 106 is in the first angular position shown in FIG. 6, the extension member 140 can be adjusted to the first position where the extension member 140 can deploy substantially outward and the forward end 140C thereof displaced forward away from the front end 106A of the seat shell 106, the forward end 140C thereby defining an extended foremost end of the child safety seat 100. This forward deployment of the extension member 140 can displace the seat shell 106 and the base 102 away from the seatback 162 of the vehicle seat 160, which can create more space in front of the child safety seat 100 for placement of the legs of a child having a taller body. Moreover, the forward end 140C of the extension member 140 can have a surface that can provide effective abuttal contact against the seatback 162 of the vehicle seat 160 for preventing rebound of the child safety seat 100 when car collision occurs. For example, the transversal portion 140A of the extension member 140 can have a surface of a substantial length that provide effective contact with the seatback 162 of the vehicle seat 160, and the extending height of the bent portions 140B can also increase the contact area of the forward end 140C with the seatback 162, which may secure a stable support against the seatback 162. Since more leg room is created at the front of the child safety seat 100, the more upright first angular position of the seat shell 106 can help to maintain some clearance between the backrest 110 of the child safety seat 100 and a seatback of a front vehicle seat (shown with phantom lines). Moreover, the center of gravity of the child sitting on the child safety seat 100 can be displaced forward, which may prevent rearward falling of the child safety seat 100.

When it is in the second angular position shown in FIG. 7, the seat shell 106 can be reclined rearward relative to the first angular position shown in FIG. 6 to accommodate a younger child having a smaller body. While the seat shell 106 is in this second angular position, the extension member 140 can be adjusted to the second position substantially retracted into the seat shell 106, the forward end 140C of the extension member 140 lying adjacent to the front end 106A of the seat shell 106. This retraction of the extension member 140 can remove the additional leg space in front of the child safety seat 100, which is not necessary for a child having a smaller body. Moreover, the retraction of the extension member 140 may also allow more recline angle in a limited vehicle space. It is worth noting that while the construction of the seat shell 106 allows convenient retraction of the extension member 140 when it is not used, other embodiments may also have the unused extension member 140 removed from the seat shell 106. Snap features may be provided in the seat shell 106 to allow detachable assembly of the extension member 140.

Referring to FIGS. 4 and 5, for adjusting the extension member 140 from the first to the second position (or reversely), a caregiver can pull the release part 148 forward to switch the release part 148 from the locking position to the unlocking position to drive the latches 142 to disengage from the sidewalls 144 as described previously. The unlocked extension member 140 then can be adjusted forward or rearward until it reaches the desired position. The caregiver then can release the release part 148, which can be biased by the spring 156 to move in the gap 150, and the latches 142 can be respectively urged by the springs 154 to engage with the sidewalls 144 for locking the extension member 140 in place.

Figure 8:
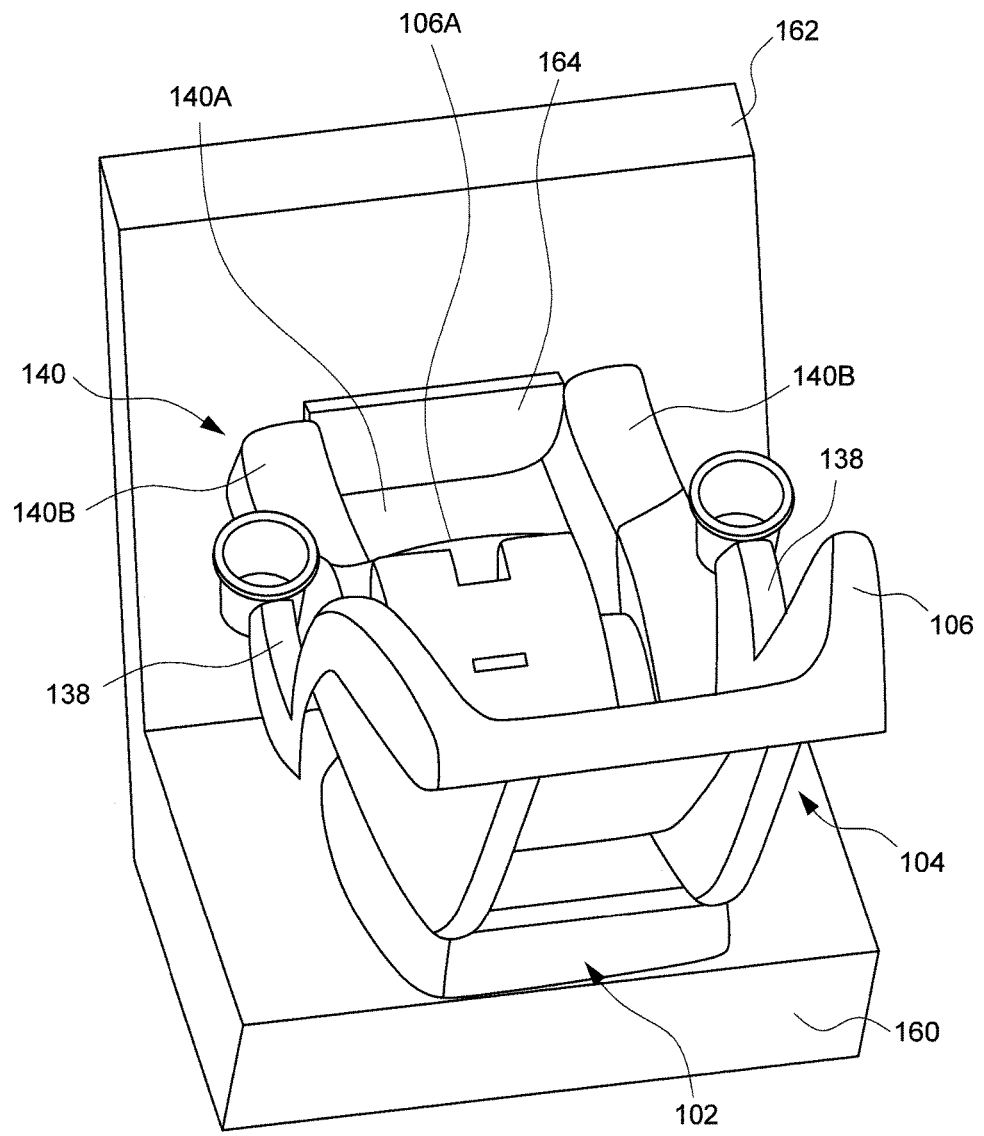
FIG. 8 is a schematic view illustrating a variant embodiment in which an extension member of the seat shell is provided with an adjustable shield.

It is worth noting that when a child sits on the seat shell 106 configured as shown in FIG. 6, the child's feet may contact the seatback 162 of the vehicle seat 160 and cause it to become dirty. FIG. 8 is a schematic view illustrating a variant embodiment in which the extension member 140 is provided with an adjustable shield 164. The shield 164 can be a panel that is made of plastic or fabric materials. When the extension member 140 is deployed forward to increase the leg room, the shield 164 can be connected with the bent portions 140B of the extension member 140 in a deployed position above the transversal portion 140A. The deployed shield 164 can cover an adjacent region of the seatback 162, and the child's feet can rest against the shield 164, which provides protection for the seatback 162. When it is unused, the shield 164 can be removed from or retracted into the extension member 140. In one embodiment, the extension member 140 can exemplary have a hollow interior in which the shield 164 can be conveniently stored, and the shield 164 can retract into and deploy outside the extension member 140.

Figure 9:
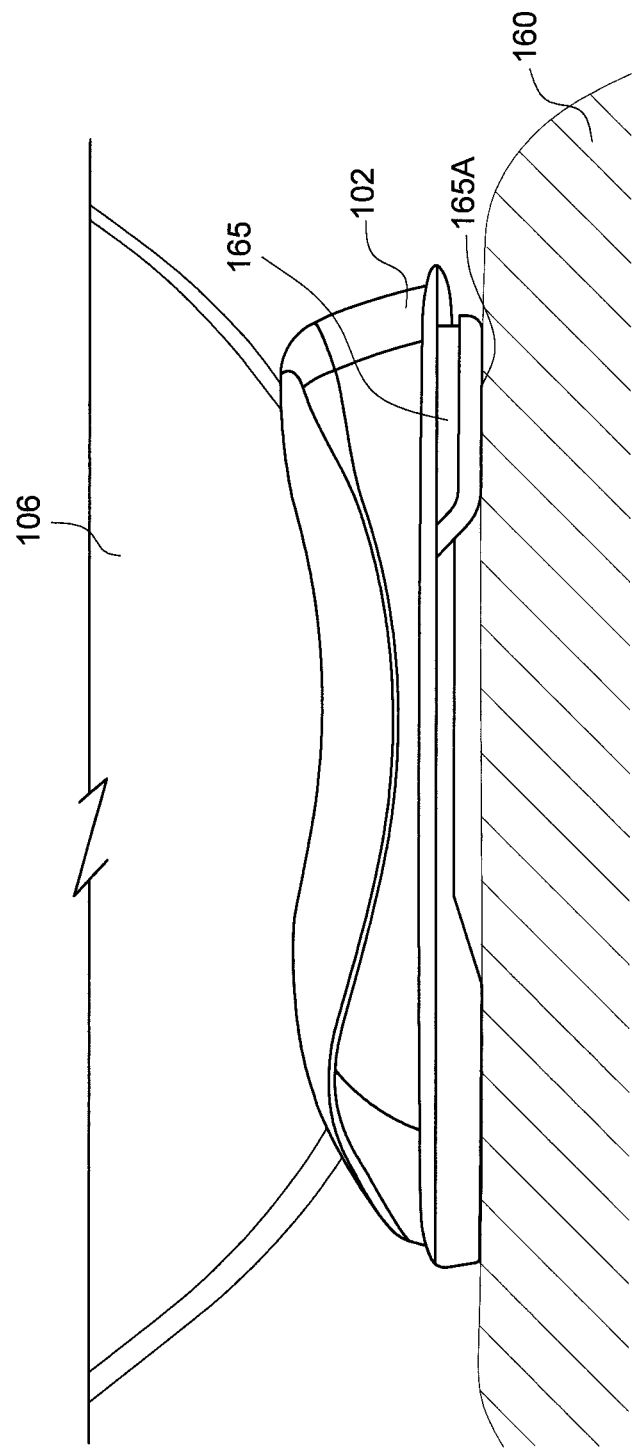
FIG. 9 is a schematic enlarged view of portion A shown in FIG. 6 illustrating a bottom of the base of the child safety seat provided with protruding heels.

While the extension member 140 is deployed to create more leg room (such as shown in FIG. 6), the child safety seat 100 is displaced further off the seatback 162 of the vehicle seat 160, which may create the perception of a loose support on the vehicle seat 160. FIG. 9 is a schematic enlarged view of portion A shown in FIG. 6 illustrating a bottom of the base 102 provided with protruding heels 165. The heels 165 can arranged at a side of the base 102 away from the side of the forward end 140C of the extension member 140. Each of the protruding heels 165 can have a contact surface 165A made of a material that promotes frictional contact with the vehicle seat 160. This arrangement can provide resistance to relative movement between the child safety seat and the vehicle seat.

Figure 10:
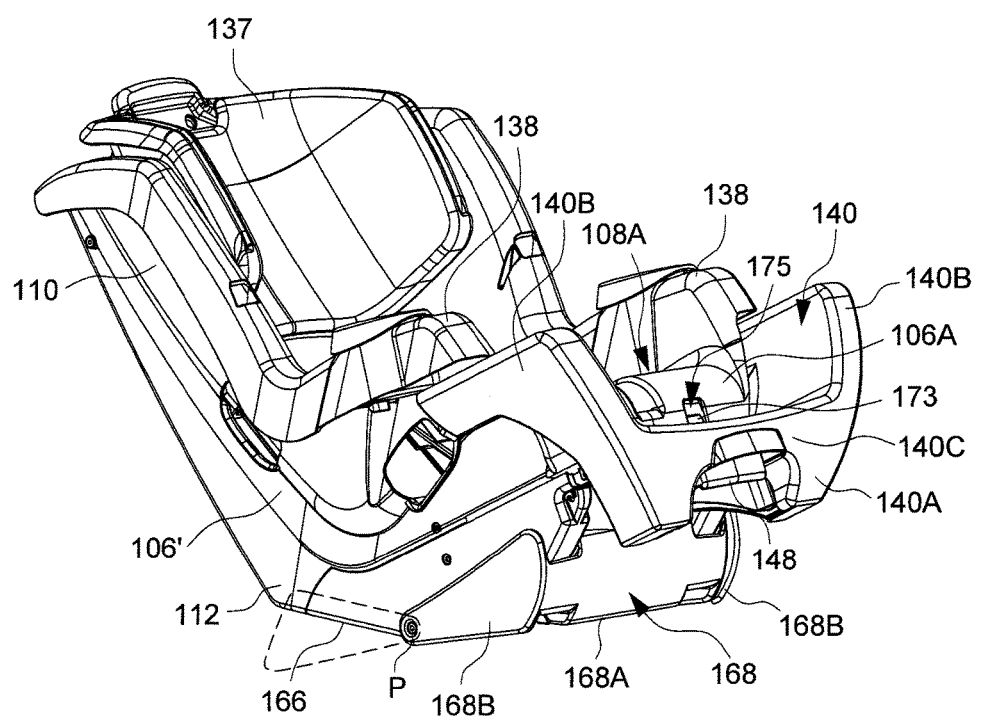
FIG. 10 is a schematic view illustrating another embodiment of a child safety seat.

FIG. 10 is a schematic view illustrating another embodiment of a child safety seat 100'. Like the child safety seat 100 described previously, the child safety seat 100' has a seat shell 106' that has the extension member 140 adjustable to increase a leg room at the front of the child safety seat 100' for accommodating a child having a taller body. One difference is that the seat shell 106' of the child safety seat 100' is configured to have a bottom surface 166 that can stably rest on a vehicle seat without the need of the base 102 previously described. For example, the bottom surface 166 can be defined by the lower surfaces of the two support rails 112. Moreover, the seat shell 106' can be further assembled with a front foot 168 that is arranged near the front of the seat shell 106' and in front of the bottom surface 166. The front foot 168 and the seat shell 106' are movable relative to each other so as to convert the seat shell 106' between two different angular positions in the rear facing configuration.

Figure 11:
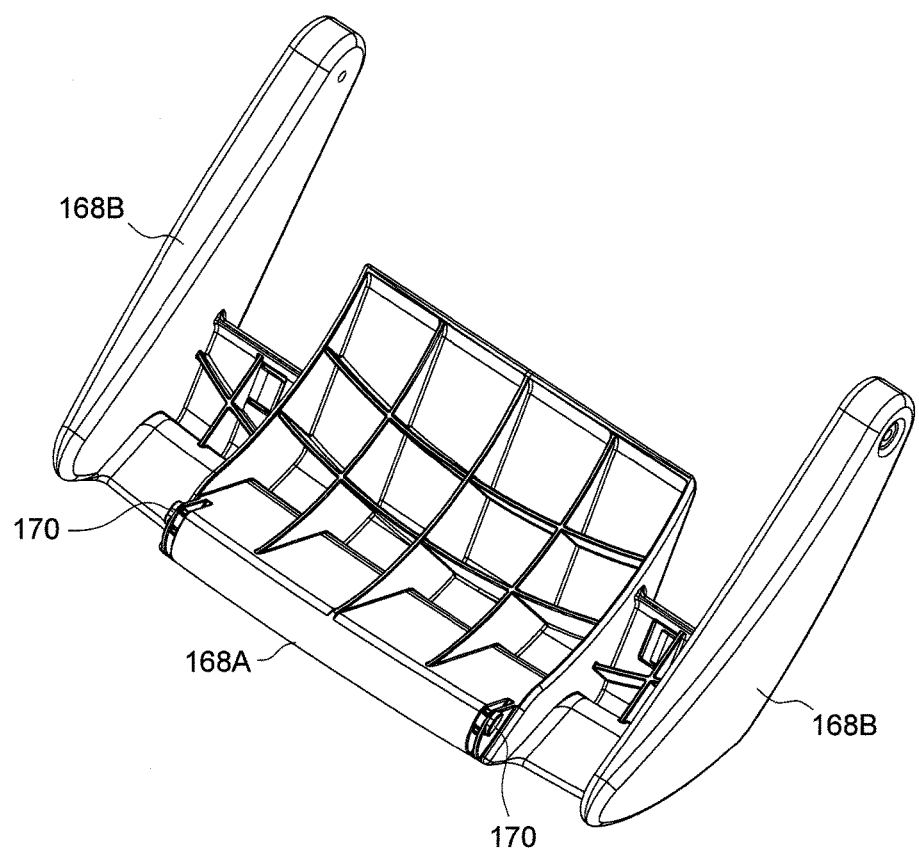
FIG. 11 is a schematic view illustrating the construction of a front foot used in the child safety seat shown in FIG. 10.
Figure 12:
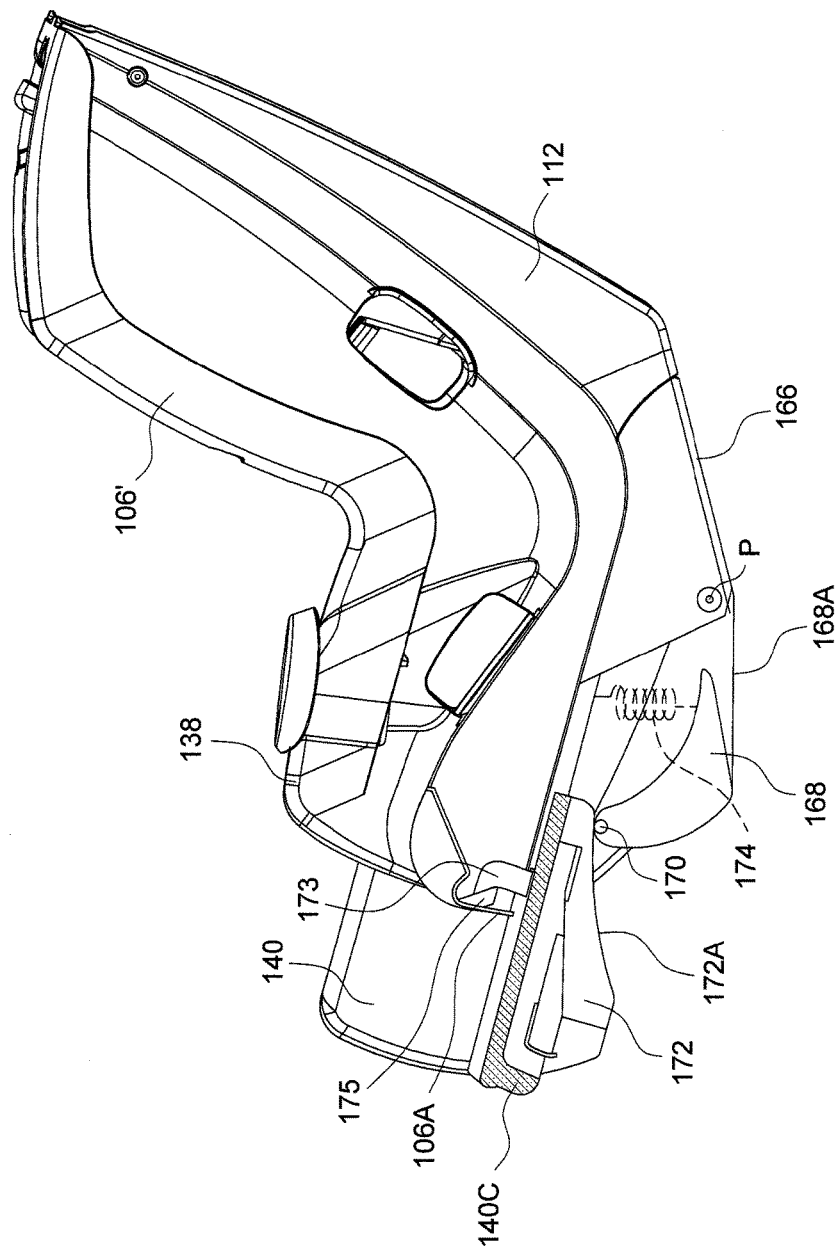
FIG. 12 is a schematic view illustrating the assembly of the front foot shown in FIG. 11 with the seat shell.

In conjunction with FIG. 10, FIG. 11 is a schematic view illustrating the front foot 168 alone, and FIG. 12 is a schematic partial cross-sectional view illustrating the assembly of the front foot 168 with the seat shell 106'. For clarity, some portions of the front foot 168 and the extension member 140 are omitted in FIG. 12 to better represent the assembly of the front foot 168 in the seat shell 106'. The front foot 168 can be pivotally connected with the seat shell 106' about a pivot axis P. More specifically, the front foot 168 can include a transversal portion 168A, and a left and a right bracket portion 168B connected fixedly with a left and a right side of the transversal portion 168A. When the front foot 168 is assembled with the seat shell 106', the two bracket portions 168B can be pivotally connected with the seat shell 106' about the pivot axis P, and the transversal portion 168A can extend across a width of the seat shell 106' and lie adjacent to the extension member 140.

Referring to FIGS. 11 and 12, the front foot 168 can be further arranged so as to interact with the extension member 140. More specifically, the transversal portion 168A can have two opposite sidewalls respectively formed with protrusions 170, and the extension member 140 can have one or more guide structures in sliding contact with the protrusions 170. In one embodiment, the guide structure can be exemplary formed as a keel 172 defining a ramp surface 172A that faces downward and rises toward a rear of the extension member 140. The ramp surface 172A can have a curved or inclined profile. The protrusion 170 of the front foot 168 can be in sliding contact against the ramp surface 172A. In one embodiment, in order to ensure that the front foot 168 remains in sliding contact with the extension member 140, an optional spring 174 (shown with phantom lines) may be connected with the front foot 168 and the seat shell 106', the spring 174 biasing the front foot 168 in a direction for keeping the protrusion 170 in sliding contact against the ramp surface 172A. With this construction, adjustment of the angular position of the seat shell 106' can be coupled with the adjustment of the extension member 140.

Figure 13:
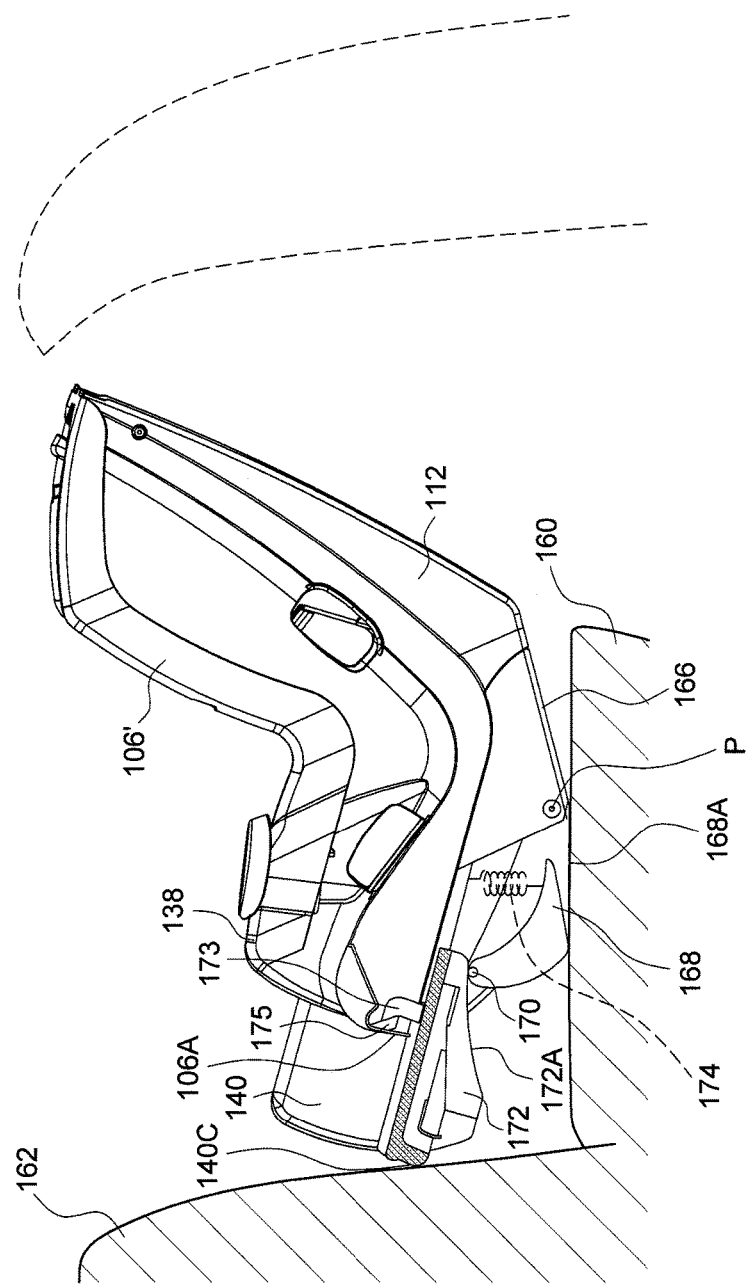
FIG. 13 is a schematic view illustrating the child safety seat of FIG. 10 installed facing rearward in a first angular position on a vehicle seat.
Figure 14:
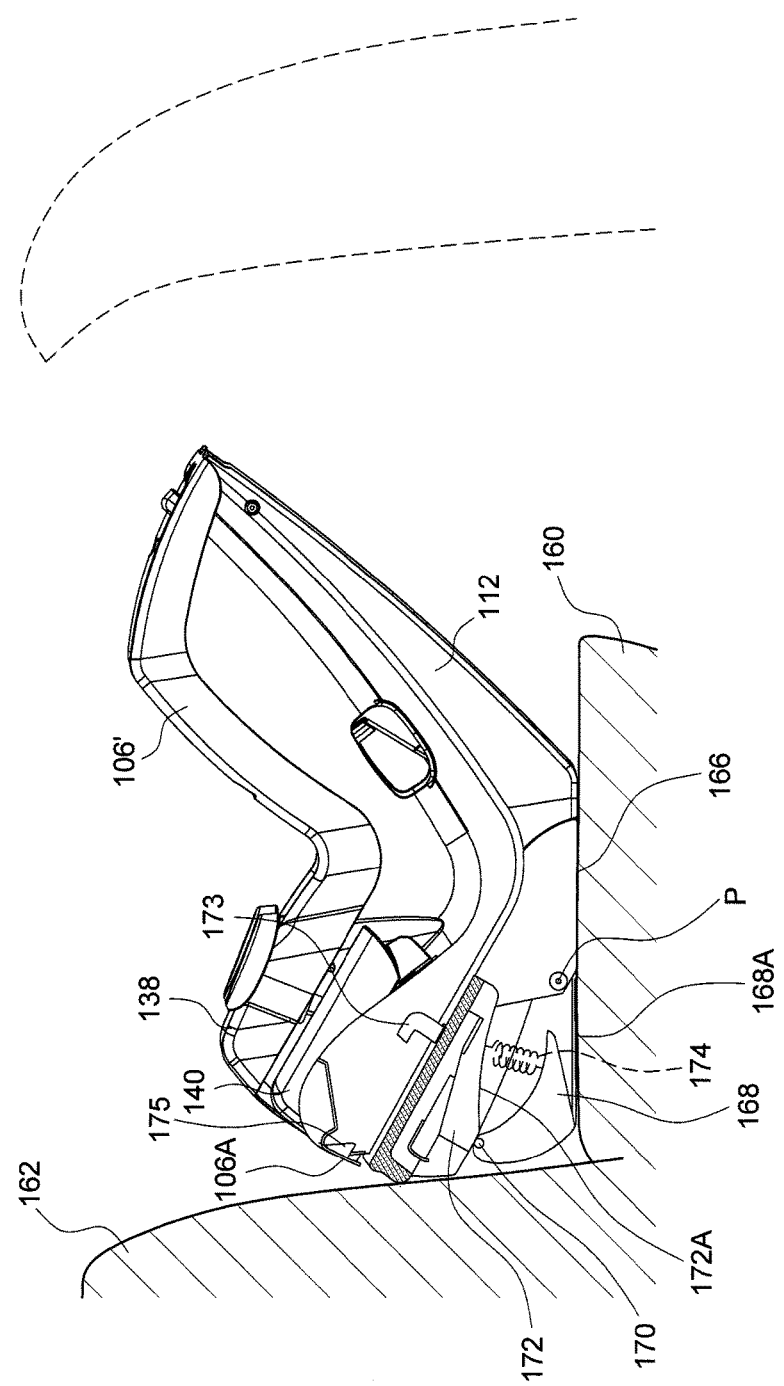
FIG. 14 is a schematic view illustrating the child safety seat of FIG. 10 installed facing rearward in a second angular position on a vehicle seat.

In conjunction with FIG. 12, FIGS. 13 and 14 are schematic views illustrating the child safety seat 100' installed on the vehicle seat 160 in a rear facing configuration. The representation in FIGS. 13 and 14 is shown with certain portions of the front foot 168 and extension member 140 cut away so as to better illustrate the interaction between the protrusion 170 of the front foot 168 and the ramp surface 172A of the extension member 140. In the rear facing configuration, the seat shell 106' is arranged such that its front faces the seatback 162 of the vehicle seat 160, and the bottom of the seat shell 106' can directly rest on the vehicle seat 160. When the child safety seat 100' is in the rear facing configuration, the seat shell 106' is adjustable to multiple angular positions, such as an upright or first angular position as shown in FIG. 13, and a recline or second angular position as shown in FIG. 14 that is reclined rearward relative to the first angular position of FIG. 13.

When the seat shell 106 is in the first angular position shown in FIG. 13, the extension member 140 can be adjusted to the first position where it deploys substantially outward and the forward end 140C is displaced forward away from the front end 106A of the seat shell 106 to define an extended foremost end of the child safety seat 100'. As the extension member 140 deploys forward, the protrusion 170 of the front foot 168 can be relatively displaced to a rearward position on the ramp surface 172A. Moreover, the seat shell 106' can be rotated relative to the front foot 168 so that a bottom surface 168A of the front foot 168 can be at an angle relative to the bottom surface 166 of the seat shell 106'. In this configuration, the bottom surface 168A of the front foot 168 can rest on the vehicle seat 160 and substantially support the seat shell 106', whereas the bottom surface 166 of the seat shell 106' located behind the bottom surface 168A of the front foot 168 is substantially out of contact with the vehicle seat 160. This forward deployment of the extension member 140 can create more space in front of the child safety seat 100' for placement of the legs of a child having a taller body. When the extension member 140 is in the deployed position, one or more rib 173 provided on the extension member 140 may respectively engage with one or more opening 175 formed at the front end 106A of the seat shell 106'.

In the second angular position shown in FIG. 14, the extension member 140 can be retracted into the seat shell 106, so that the forward end 140C of the extension member 140 lies adjacent to the front end 106A of the seat shell 106'. Owing to the sliding contact between the ramp surface 172A and the front foot 168, the displacement of the extension member 140 toward the seat shell 106' can drive a relative rotation between the front foot 168 and the seat shell 106' about the pivot axis P to cause the seat shell 106' to recline rearward. When the extension member 140 is fully retracted in the second angular position shown in FIG. 14, the protrusion 170 of the front foot 168 can be relatively displaced to a forward position on the ramp surface 172A, and the bottom surface 168A of the front foot 168 and the bottom surface 166 of the seat shell 106' can be substantially level to evenly rest on the vehicle seat 160. In this recline configuration, the seat shell 106' can accommodate a younger child having a smaller body. Owing to the contact between the extension member 140 and the front foot 168, the extension member 140 when in the retracted position can also block a rotational displacement of the front foot 168 relative to the seat shell 106' from its position shown in FIG. 14 to the position shown in FIG. 13. Accordingly, the front foot 168 can be kept substantially level with the bottom surface 166 of the seat shell 106'.

Referring again to FIG. 10, in certain embodiment in which the child safety seat 100' can be installed on a vehicle seat facing forward, the front foot 168 may also be arranged so as to be rotatable toward the bottom surface 166 to a position (shown with phantom lines) stowed rearward.

Figure 15:
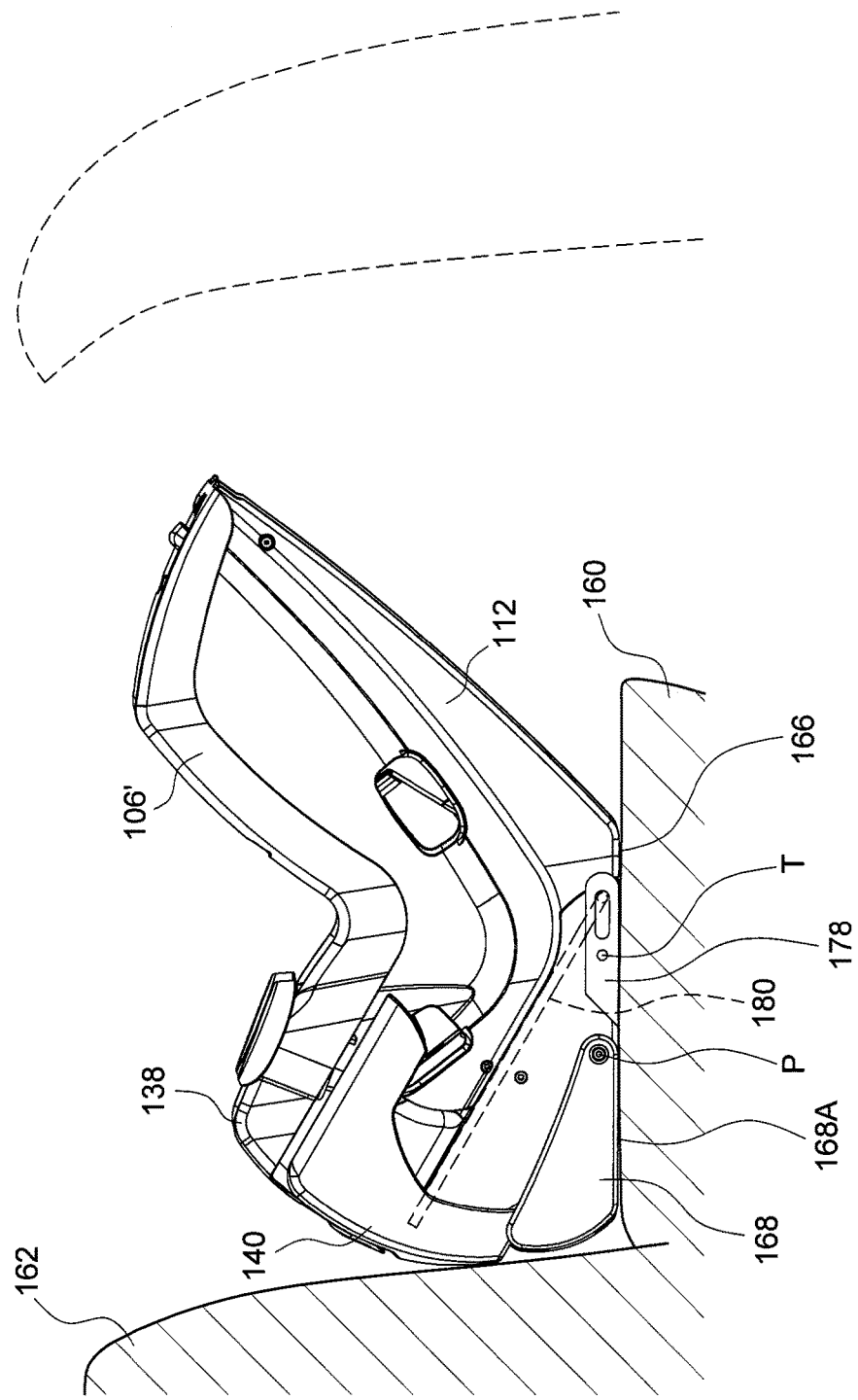
FIGS. 15 and 16 are schematic views illustrating an embodiment in which the seat shell is further connected with a rear foot to provide additional standing support.
Figure 16:
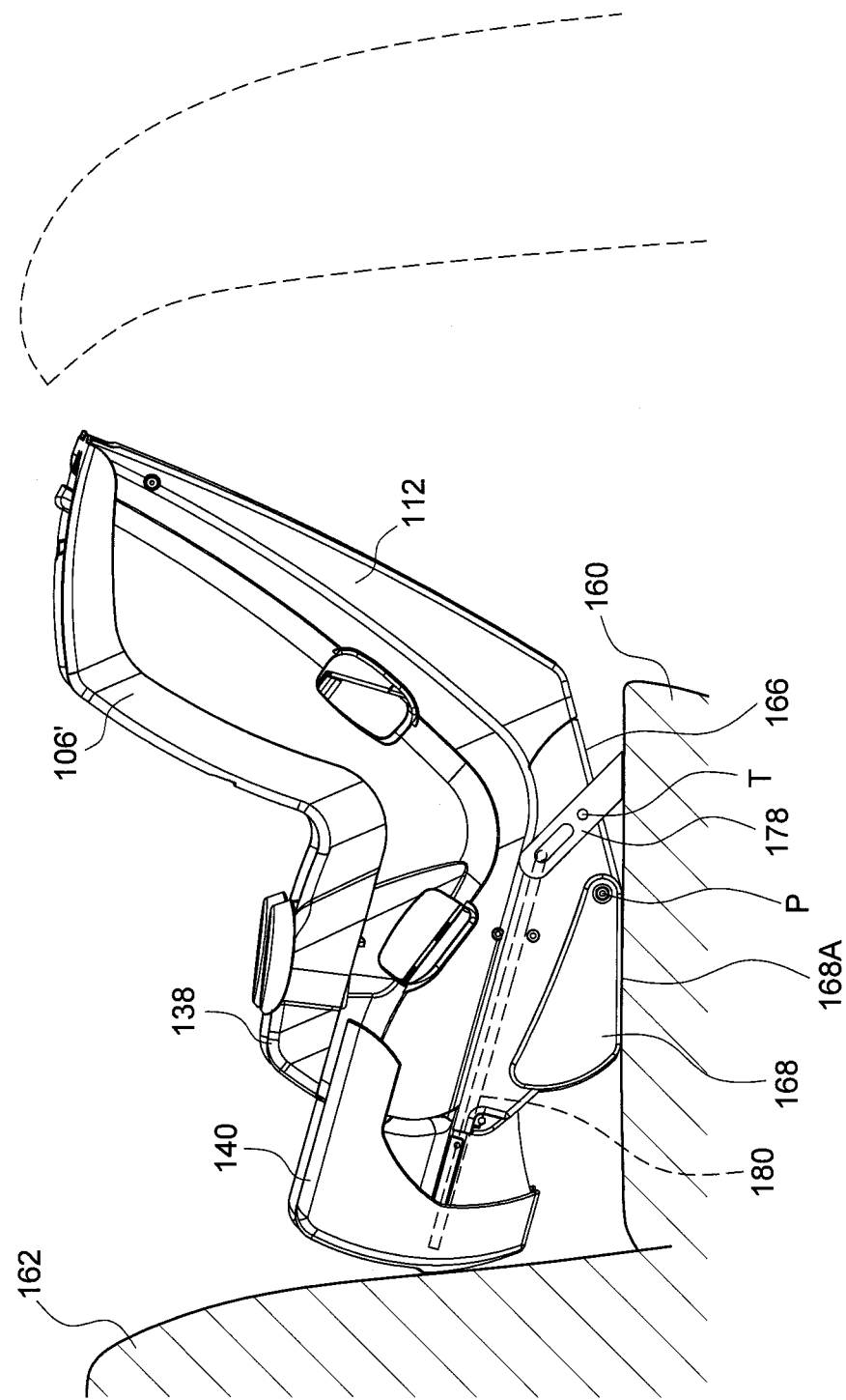

For better support stability of the seat shell 106' when the extension member 140 is deployed as shown in FIG. 13, additional support structures can be provided on the seat shell 106'. FIGS. 15 and 16 are schematic views illustrating an embodiment in which the seat shell 106' may be further pivotally connected with a rear foot 178 about a pivot axis T. The rear foot 178 can be placed behind the front foot 168, and can be further pivotally connected with a linkage 180 affixed with the extension member 140. The pivot axis T of the rear foot 178 can be located behind the pivot axis P of the front foot 168. Rearward displacement of the extension member 140 can drive a rotation of the rear foot 178 to the retracted position shown in FIG. 15, and forward displacement of the extension member 140 can drive a reverse rotation of the rear foot 178 to the deployed position shown in FIG. 16.

In FIG. 15, the extension member 140 is shown as being stowed into the seat shell 106', and the rear foot 178 is in a retracted position above the bottom surface 166 of the seat shell 106'. In this configuration, the bottom surface 166 of the seat shell 106' and the front foot 168 can be substantially level to provide support on the vehicle seat 160.

In FIG. 16, as it is extended forward, the extension member 140 can drive rotation of the rear foot 178 about the pivot axis T to a deployed position projecting below the bottom surface 166 of the seat shell 106' and behind the pivot axis P of the front foot 168. Moreover, the front foot 168 can be rotationally displaced relative to the seat shell 106' as previously described. In this configuration, the front foot 168 and the rear foot 178 can provide stable support for seat shell 106'.

Figure 17:
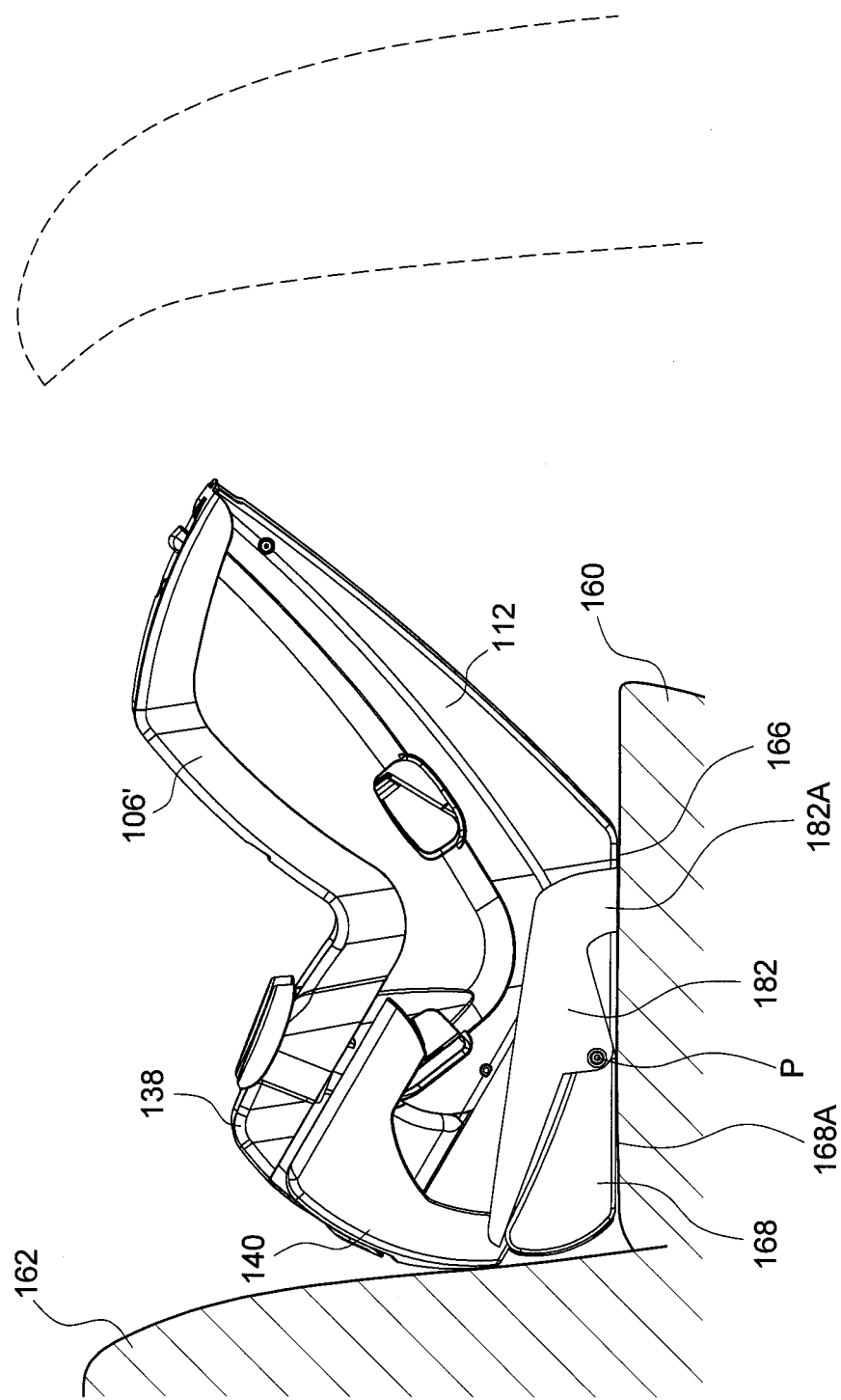
FIGS. 17 and 18 are schematic views illustrating another possible embodiment in which the seat shell is further assembled with a lever to provide additional standing support.
Figure 18:
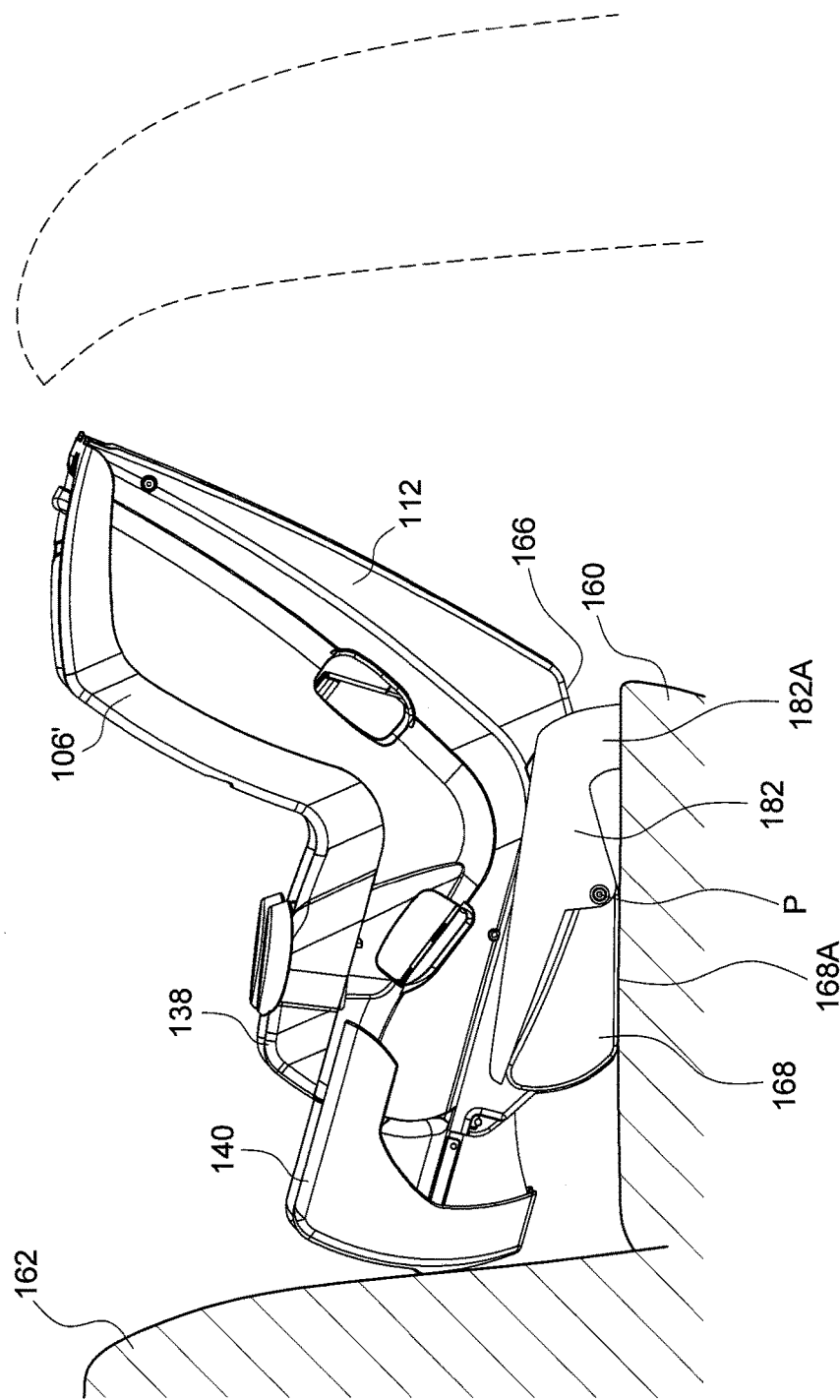

FIGS. 17 and 18 are schematic views illustrating another possible embodiment in which the seat shell 106' may be further assembled with a lever 182. The lever 182 can be toggled by the front foot 168 about the pivot axis P, and can extend behind the front foot 168 and the pivot axis P. When the seat shell 106' rotates relative to the front foot 168, a projecting portion 182A of the lever 182 may either retract to lie above the bottom surface 166 of the seat shell 106' or project below the bottom surface 166.

In FIG. 17, the extension member 140 is shown as being stowed into the seat shell 106', and the front foot 168 is substantially flush with the bottom surface 166 of the seat shell 106'. In this recline configuration of the seat shell 106', the lever 182 is in a retracted position above the bottom surface 166 of the seat shell 106', and the bottom surface 166 of the seat shell 106' and the front foot 168 can be substantially level to provide stable support on the vehicle seat 160.

In FIG. 18, the extension member 140 is shown as being deployed forward, and the seat shell 106' is rotated relative to the front foot 168 and the lever 182 so that the bottom surface 168A of the front foot 168 is inclined an angle relative to the bottom surface 166 of the seat shell 106'. In this upright configuration of the seat shell 106', the projecting portion 182A of the lever 182 can protrude below the bottom surface 166 of the seat shell 106', and the seat shell 106' can stand stably on the front foot 168 and the lever 182.

The arrangement of the extension member 140 as described previously allows to adjust a leg room at the front of the child safety seat to accommodate children of different age. It will be understood that the extension member is not limited to the aforementioned constructions, and other embodiments may be possible as illustrated in FIGS. 19-22.

Figure 19:
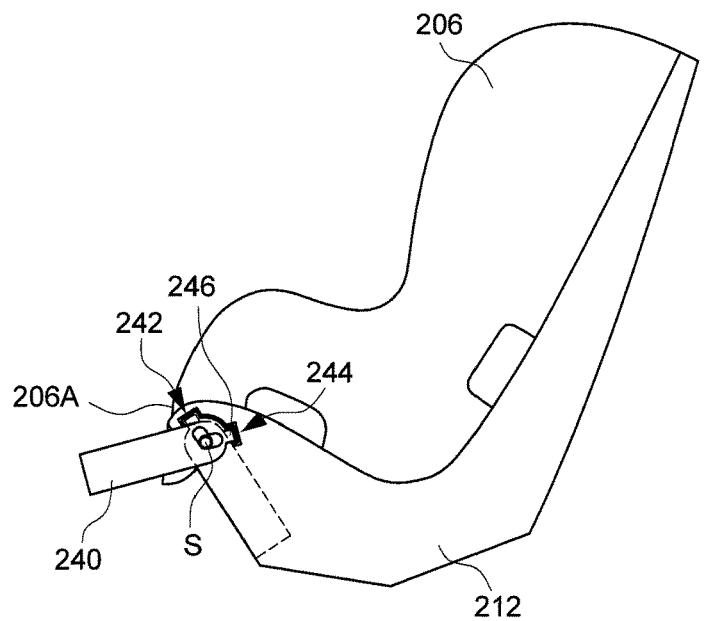
FIGS. 19-22 are schematic views illustrating other variant embodiments of child safety seats provided with adjustable extension members for increasing a leg room.

In the embodiment shown in FIG. 19, the extension member 240 can be pivotally connected with the seat shell 206 near the front end 206A thereof. The pivot axis S of the extension member 240 can extend transversally relative to the seat shell 240. The extension member 240 can rotate about the pivot axis S relative to the seat shell 206 between a retracted position (shown with phantom lines) stowed into the seat shell 206, and a deployed position (shown with solid lines) where the extension member 240 deploys forward beyond the front end 206A of the seat shell 206 to expand the leg room at the front of the child safety seat. Moreover, the seat shell 206 can have two grooves 242 and 244 disposed at two different angular positions relative to the pivot axis S, and the extension member 240 can have a rib 246 that can engage with either of the grooves 242 and 244 to respectively lock the extension member 240 in either of the retracted and deployed position.

Figure 20:
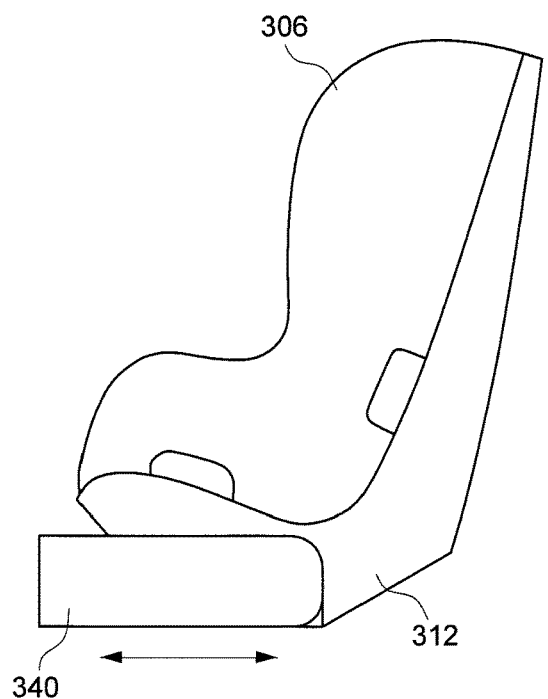

In the embodiment shown in FIG. 20, the extension member 340 can be slidably connected with the support rails 312 at the bottom of the seat shell 306, and can slide back and forth. The extension member 340 can deploy forward to expand the leg room at the front of the seat shell 306, when the seat shell 306 is installed in a rear facing configuration. Rather than a sliding assembly, it will be appreciated that the extension member may also be pivotally connected with the seat shell 406 about a pivot axis that extends vertical near the front end of the seat shell 406. Such construction can allow to pivotally deploy or retract the extension member.

Figure 21:
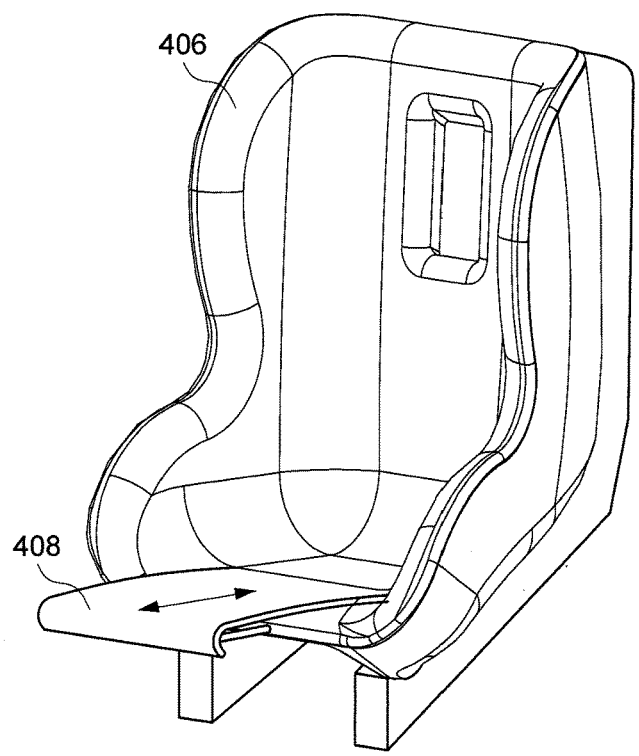

In the embodiment shown in FIG. 21, the extension member can be constructed as a movable seat board 408 assembled with the seat shell 406 for lengthwise displacement. A child received on the seat shell 406 can sit on the seat board 408. The seat board 408 can slide forward to form an extended foremost end for expanding the leg room for older children, and slide rearward to retract toward the interior of the seat shell 406 between the two armrests for accommodating younger children. Rather than a sliding assembly, it will be appreciated that the seat board 408 may also be pivotally connected with the seat shell 406 about a pivot axis that extends transversally near the front end of the seat shell 406. Such construction can allow to pivotally deploy or retract the seat board.

Figure 22:
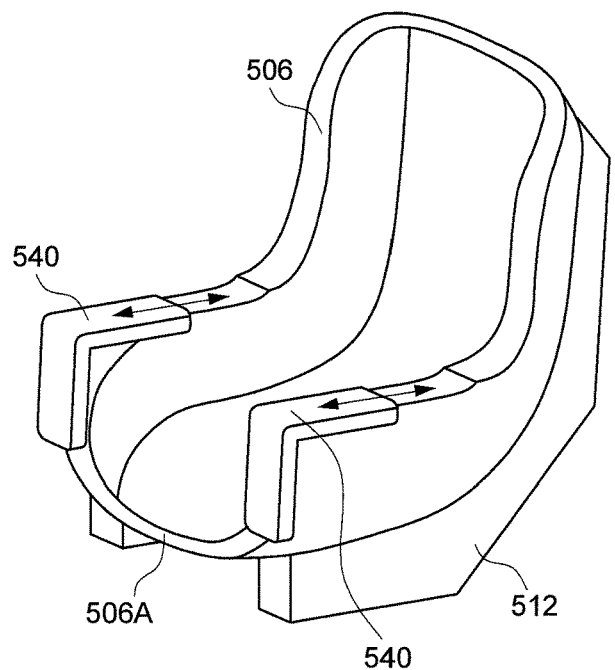

In the embodiment shown in FIG. 22, the extension member can be constructed as movable armrests 540 assembled with the seat shell 506. When the seat shell 506 is installed facing rearward on a vehicle seat, the armrests 540 can slide forward beyond the front end 506A of the seat shell 506 to increase a leg room at the front of the seat shell 506.

Advantages of the structures described herein include the ability to adjust the front leg room when the child safety seat is installed in a rear facing configuration, so that the child safety seat can accommodate children of different ages.

Realizations of the child safety seats have been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:

1. A child safety seat for seating a child in a vehicle, comprising:
   a seat shell having a seat portion and a backrest, the seat portion having a front end opposite to the backrest; and
   an extension member pivotally connected with the seat shell, the extension member being rotatable relative to the seat shell between a retracted position where the extension member is stowed in the seat shell and a deployed position where the extension member deploys forward beyond the front end of the seat shell to expand a leg room at a front of the child safety seat, wherein the extension member has a rib and the seat shell has a first and a second groove, the rib engaging with the first groove to lock the extension member in the retracted position and with the second groove to lock the extension member in the deployed position.

2. The child safety seat according to claim 1, wherein the extension member is pivotally connected with the seat shell near the front end.

3. The child safety seat according to claim 1, wherein the first and second grooves are disposed near the front end.

4. The child safety seat according to claim 1, wherein the extension member is pivotally connected with the seat shell about a pivot axis extending transversally relative to the seat shell.

5. The child safety seat according to claim 4, wherein the extension member stretches rearward and downward from the pivot axis in the retracted position.

6. A child safety seat for seating a child in a vehicle, comprising:
   a seat shell having a seat portion and a backrest, the seat portion having a front end opposite to the backrest, the seat shell further having a first and a second groove; and
   an extension member pivotally connected with the seat shell near the front end, the extension member being rotatable relative to the seat shell between a retracted position where the extension member is stowed in the seat shell and a deployed position where the extension member deploys forward beyond the front end of the seat shell to expand a leg room at a front of the child safety seat, the extension member having a rib, the rib engaging with the first groove to lock the extension member in the retracted position and with the second groove to lock the extension member in the deployed position.

7. The child safety seat according to claim 6, wherein the first and second grooves are disposed near the front end.

8. The child safety seat according to claim 6, wherein the extension member is pivotally connected with the seat shell about a pivot axis extending transversally relative to the seat shell.

9. The child safety seat according to claim 8, wherein the extension member stretches rearward and downward from the pivot axis in the retracted position.

* * * * *